United States Patent [19]

Ogawa et al.

[11] Patent Number: 5,324,548

[45] Date of Patent: * Jun. 28, 1994

[54] METHOD FOR MAKING OPTICAL RECORDING MEDIUMS

[75] Inventors: Kazufumi Ogawa, Osaka; Hideharu Tamura, Tokyo; Norihisa Mino, Osaka, all of Japan

[73] Assignee: Matsushita Electric Industrial Co., Ltd., Osaka, Japan

[ * ] Notice: The portion of the term of this patent subsequent to Mar. 23, 2018 has been disclaimed.

[21] Appl. No.: 968,874

[22] Filed: Oct. 30, 1992

Related U.S. Application Data

[63] Continuation of Ser. No. 389,395, Aug. 4, 1989, Pat. No. 5,196,227.

Foreign Application Priority Data

Aug. 5, 1988 [JP] Japan ............................ 63-196569

[51] Int. Cl.$^5$ .............................................. B05D 3/06
[52] U.S. Cl. ................................ 427/492; 427/144.1; 427/162; 427/407.1; 427/430.1; 427/518; 427/512; 427/515

[58] Field of Search ............. 427/162, 150, 407.1, 427/430.1, 409, 144, 385.5, 238, 54.1, 36, 43.1, 44, 487, 492, 498, 503, 504, 508, 510, 512, 515, 518, 407.1; 430/270, 273, 495; 437/238

[56] References Cited

U.S. PATENT DOCUMENTS

| | | | |
|---|---|---|---|
| 4,615,962 | 10/1986 | Garito | 427/54.1 |
| 4,673,474 | 6/1987 | Ogawa | 204/157.64 |
| 4,761,316 | 8/1988 | Ogawa | 427/44 |
| 4,782,006 | 11/1988 | Nishimura et al. | 430/292 |

*Primary Examiner*—Janyce Bell
*Attorney, Agent, or Firm*—Lowe, Price, LeBlanc & Becker

[57] ABSTRACT

A method for making an optical recording medium having an optically responsive polydiacetylene monomolecular film or monomolecular built-up film is provided. In the method, a substrate having a hydrophilic surface is immersed in a solution, in organic solvent, of a substance containing a diacetylene group and an —Si—Cl group to form a monomolecular film of the substance on the substrate by chemical adsorption. The diacetylene groups are polymerized by energy beam irradiation to obtain the optically responsive polydiacetylene film. This medium is usable as a write-once or rewriteable medium.

11 Claims, 4 Drawing Sheets

METHOD FOR MAKING OPTICAL RECORDING MEDIUMS

This application is a continuation of application Ser. No. 07/389,395, filed Aug. 4, 1989, now U.S. Pat. No. 5,196,227.

BACKGROUND OF THE INVENTION

1. Field of the Invention

This invention relates to optical recording mediums and more particularly, to a method for making an optical recording medium which comprises as a recording layer a monomolecular film or a monomolecular built-up film having polydiacetylene bonds exhibiting photochromic characteristics.

2. Description of the Prior Art

As is known in the art, polymers of diacetylene derivatives have one dimensional main chain with $\pi$-electron conjugated bonds in the molecule and thus exhibit electric conductivity and a non-linear optical effect. These polymers have been widely studied for use as a light or electron-responsive material.

As a process of preparing polydiacetylene, there is known a process wherein crystals of a diacetylene compound (G. Wegner, Z. Nature forsch 246(1989) 824) or a monomolecular built-up film of a diacetylene compound formed by the Langmuir-Blodgett method (C. Bubeck et al., Der Bunsenges Phys. Chem. 86,495 (1982)) is polymerized by irradiation of a radiation.

However, it has not been reported yet that a single crystal of polydiacetylene having a large area is obtained. On the other hand, a thin film with a large area is obtained from a monomolecular built-up film of a diacetylene compound formed by the LB method, but the production efficiency is very poor. If such a thin film is applied as an optical recording medium, production costs become very high with little industrial utility.

It is known that when using linear hydrocarbon derivatives having —Si—Cl group at one end, a monomolecular film can be very readily formed on the surface of a hydrophilic substrate by chemical adsorption in organic solvent. The addition of a certain substituent to the surface of the monomolecular film will render the surface hydrophilic by chemical reaction after the adsorption. This is known to be effective in obtaining a monomolecular built-up film as described, for example, in U.S. Pat. No. 4,535,061, to J. Sagiv.

Accordingly, if a substance having a diacetylene bond in part of a linear hydrocarbon is subjected to chemical adsorption, a monomolecular film of the diacetylene derivative can be formed having a layer thickness in the order of several ten angstroms. A multi-layered built-up film can also be obtained readily.

SUMMARY OF THE INVENTION

It is an object of the invention to provide a method for making an optical recording medium wherein a polydiacetylene thin film or built-up film with an area sufficient for the medium is fabricated in high efficiency and wherein the medium can be made simply at low production costs.

It is another object of the invention to provide a method for making an optical recording medium which has a very high recording density, high performance and high reliability and whose recording layer is pinhole-free.

It is a further object of the invention to provide a method for readily making an optical multiple recording medium which makes use of a monomolecular built-up film.

According to the invention, there is provided a method for making an optical recording medium which comprises:

(a) immersing a substrate having a hydrophilic surface in a non-aqueous solution of a substance having in the molecule a diacetylene group, —C≡C—C≡C—, and a —Si—Cl group in an organic solvent to form a monomolecular film of the substance on the substrate by chemical adsorption; and (b) subjecting the thus immersed substrate to energy beam irradiation to activate and polymerize the diacetylene groups in the monomolecular film whereby the monomolecular film has a polyacetylene bonding assuming a certain color which undergoes a color change on irradiation of an energy beam and is used as a recording layer.

This is based on the finding that when an energy beam including UV light is irradiated on the monomolecular film or built-up film of the substance, the diacetylene groups in the film undergo polymerization thereby forming a diacetylene polymer in the monomolecular film or monomolecular built-up film. More particularly, the molecules of the diacetylene derivative on the hydrophilic substrate are aligned regularly, under which when the molecules are polymerized, the resultant polydiacetylene having conjugated bonds continuously formed across the monomolecular film or monomolecular built-up film obtained. If the substance has a functional group capable of undergoing reaction with the —SiCl group, a built-up film with a desired number of monomolecular layers can be obtained through reaction between the functional group and the —SiCl group.

In a specific embodiment, the substance having a diacetylene bonding, —C≡C—C≡C—, and a —Si—Cl group is a substance substituted with a —CH=CH$_2$ group at one end of the molecule. The —CH=CH$_2$ group is converted into a —CH$_2$CH$_2$OH group after the chemical adsorption or after the UV irradiation. Subsequently, the adsorbed or irradiated substrate is immersed in another non-aqueous solution of a substance having a diacetylene bonding and an —Si—Cl group in an organic solvent and chemically adsorbed on the first monomolecular film wherein the —CH$_2$CH$_2$OH has been exposed and Juxtaposed on the substrate. As a result, a monomolecular double-layer film composed of two different substances is formed on the substrate.

In another specific embodiment, the substance having a diacetylene bonding, —C≡C—C≡C—, and a —Si—Cl group is a compound substituted with an —SiH group at one end of the molecule. After chemical adsorption or UV irradiation of the substance in the form of a monomolecular film, the —SiH group is treated with an alkali for conversion into an OH group. Subsequently, the treated substrate is immersed in another non-aqueous solution of a substance having a diacetylene bonding and an —Si—Cl group in an organic solvent and chemically adsorbed on the first monomolecular film wherein the —OH has been exposed and juxtaposed on the substrate. As a result, a monomolecular double-layer film composed of two different substances is formed on the substrate.

Still alternatively, when the conversion into the OH group or —CH$_2$CH$_2$OH group and the subsequent chemical adsorption are repeated a desired number of times, a monomolecular built-up film of the desired number of monomolecular layers can be formed on the substrate.

When functional groups such as pyrrole, phenylene, chenylene and the like are added to a site adjacent to the respective —C≡C—C≡C— groups, or in place of a group adjacent to the —C≡C—C≡C— group in the respective monomolecular layers so that light absorption characteristics of the respective layers are different from one another, the resultant medium is suitably usable as an optical multiple-recording medium.

DETAILED DESCRIPTION AND EMBODIMENTS OF THE INVENTION

For the fabrication of an optical recording medium according to the invention, it is essential to form a monomolecular film or a monomolecular built-up film on a hydrophilic substrate. The optical recording medium of the invention may be in any form such as a disk, a card or the like. The substrate used may be made of any material whose surface is hydrophilic in nature including, for example, an substrate whose surface is oxidized, a semiconductive Si substrate which has an SiO$_2$ layer and the like. It is important how the monomolecular film or monomolecular built-up film which is responsive to light or other energy beams be formed. This is particularly described with reference to the accompanying drawings and particularly, to FIGS. 1a to 1d. Although a number of substances having a diacetylene bonding and —SiCl$_3$ group have been investigated, use of silane surface active agents of the formula, CH$_2$=CH—(CH$_2$)$_m$—C≡C—C≡C—(CH$_2$)$_n$—SiCl$_3$, wherein n and m are, respectively, an integer and are preferably from 1 to 10, is described for simplicity.

Figure 1A:
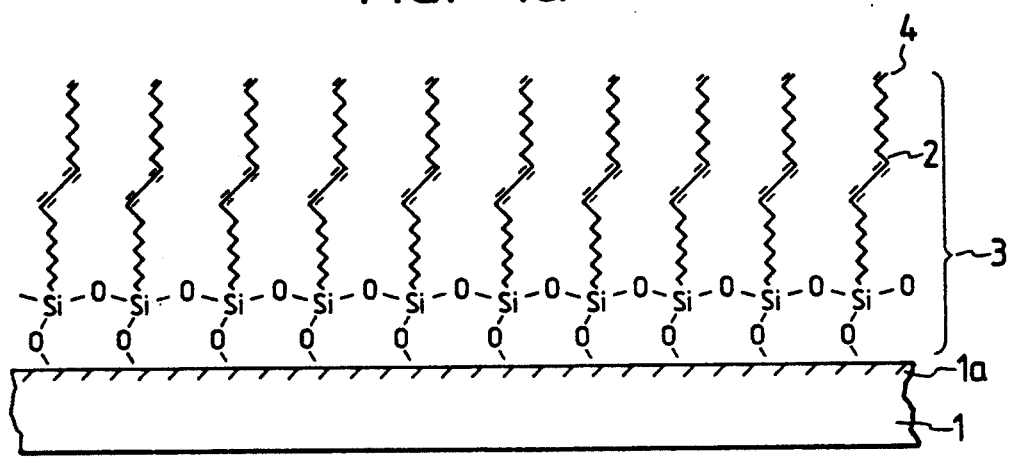
FIGS. 1a, 1b, 1c and 1d are, respectively, schematic illustrations of a process of forming an optical recording polydiacetylene layer through reactions for the formation of polydiacetylene.

Reference is now made to FIG. 1a in which there is shown a substrate 1 having a hydrophilic surface 1a. On the surface 1a is formed a monomolecular film 8 by chemical adsorption of a silane surface active agent having a diacetylene group 2 such as, for example, ω-vinyl-pentacosadiynoic trichlorosilane of the formula, CH$_2$=CH—(CH$_2$)$_{11}$—C≡C—C≡C—(CH$_2$)$_8$—SiCl$_3$. The SiCl group and the OH group formed, for example, along with the SiO$_2$ on the substrate surface 1a undergo dehydrochlorination reaction to form the monomolecular adsorption film 3 of CH$_2$=CH—(CH$_2$)$_{11}$—C≡C—C≡C—(CH$_2$)$_8$—Si—O— bonding as shown. In practice, the substrate 1 having the hydrophilic layer 1a, e.g. a Si substrate having an SiO$_2$ layer, is immersed in a solution of from $2.0 \times 10^{-3}$ to $5.0 \times 10^{-3}$ mols/liter of the silane surface active agent in a mixed solvent of, for example, 80% of n-hexane, 12% carbon tetrachloride and 8% chloroform at room temperature for several minutes, the —Si—O— bonding is formed on the SiO$_2$ surface (FIG. 1a).

Figure 2:
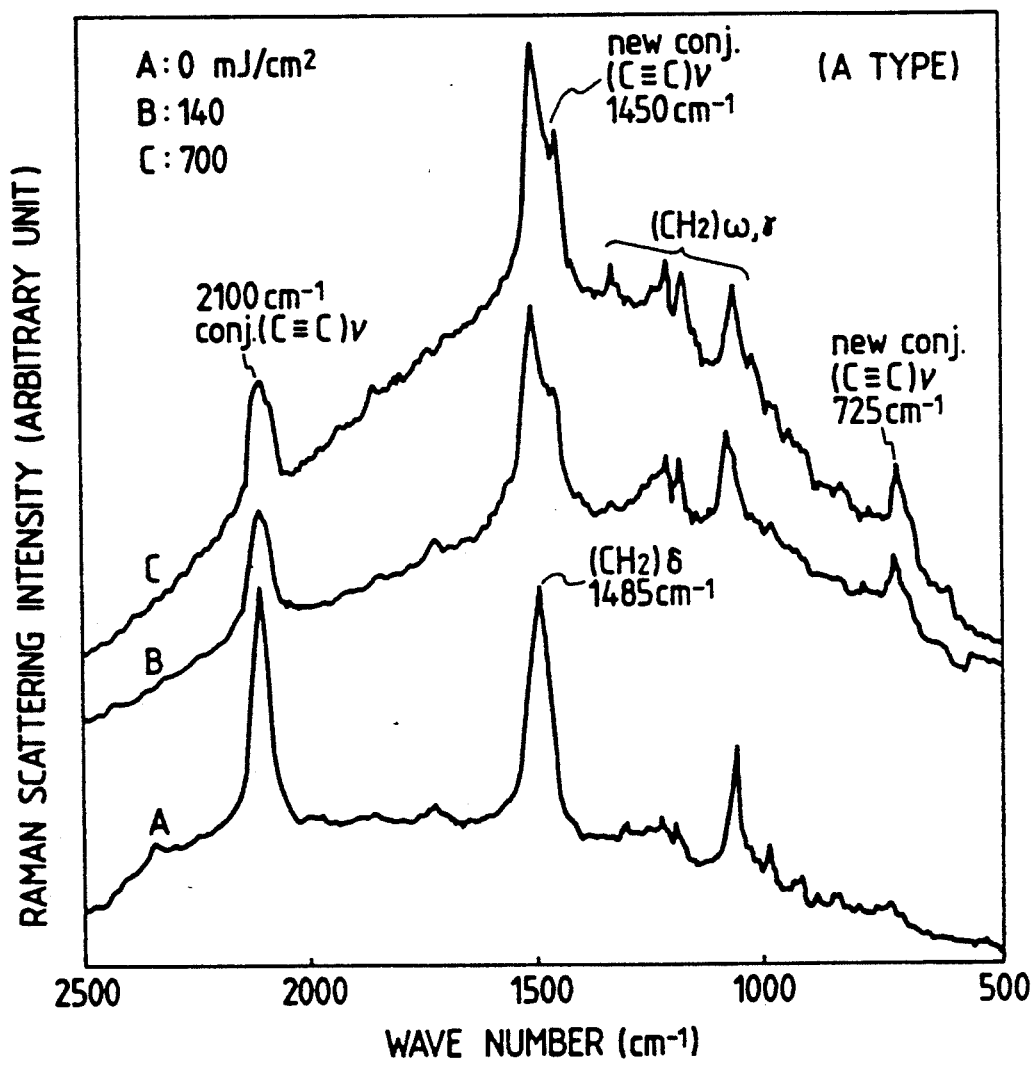
FIG. 2 is a Raman spectrum chart showing formation of polydiacetylene by UV irradiation and the results of the Fourier transform infrared spectroscopy (FTIR)

The formation of the monomolecular film of CH$_2$=CH—(CH$_2$)$_{11}$—C≡C—C≡C—(CH$_2$)$_8$—Si—O— on the substrate surface was confirmed by the Raman spectroscopy (spectrum A of FIG. 2).

Figure 1B:
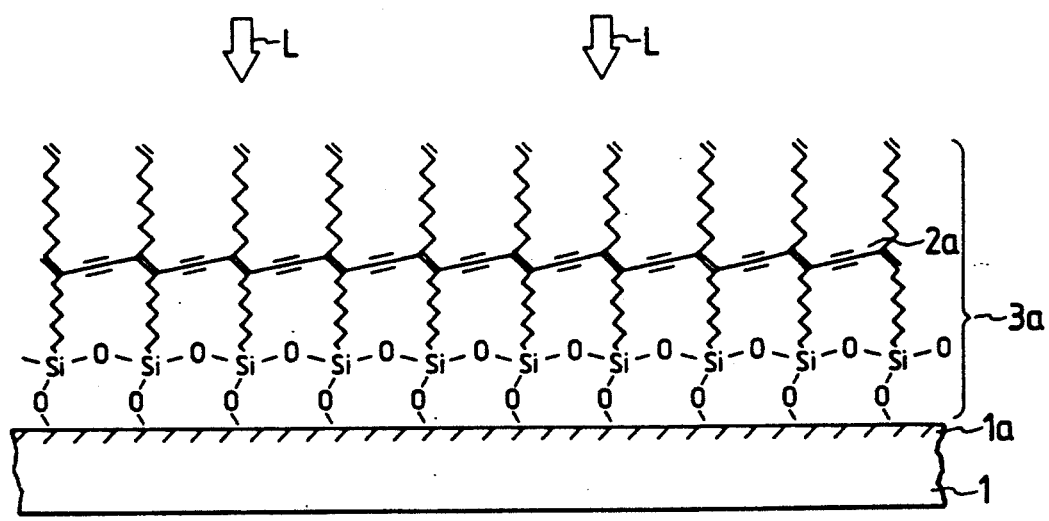

Subsequently, UV light L is irradiated on the entire surface of the monomolecular film 3 at 0.05 mw/cm$^2$ for 10 seconds by the use of a super high pressure mercury lamp whereupon the diacetylene groups are polymerized. This is particularly shown in FIG. 1b wherein a monomolecularly adsorbed film 3a having a polydiacetylene bonding 2a is formed with a blue color. The UV light used for the polymerization has a wavelength of from 200 to 400 nm. In order to confirm the polymerization of the adsorbed film, the Raman scattering spectrum at different irradiation doses of 140 mJ/cm$^2$ and 700 mJ/cm$^2$ was measured. This is particularly shown in FIG. 2 as spectra B and C. In either case, the absorption at 2100 cm$^{-1}$ (conjugated triple bond) is reduced by the UV irradiation, with an increase of an absorption at 1450 cm$^{-1}$ (C=O absorption). This gives evidence that polydiacetylene having a (—C=C—CH=CH—C≡C—)$_n$ bond is formed by the polymerization. More particularly, the molecular alignment as shown in FIG. 1a is converted through the polymerization reaction by the UV irradiation into the polydiacetylene as shown in FIG. 1b. It will be noted that the formation of the polydiacetylene bonding is feasible by application of not only UV light, but also higher energy beams such as X-rays, electron beams including a gamma ray and the like.

Figure 1C:
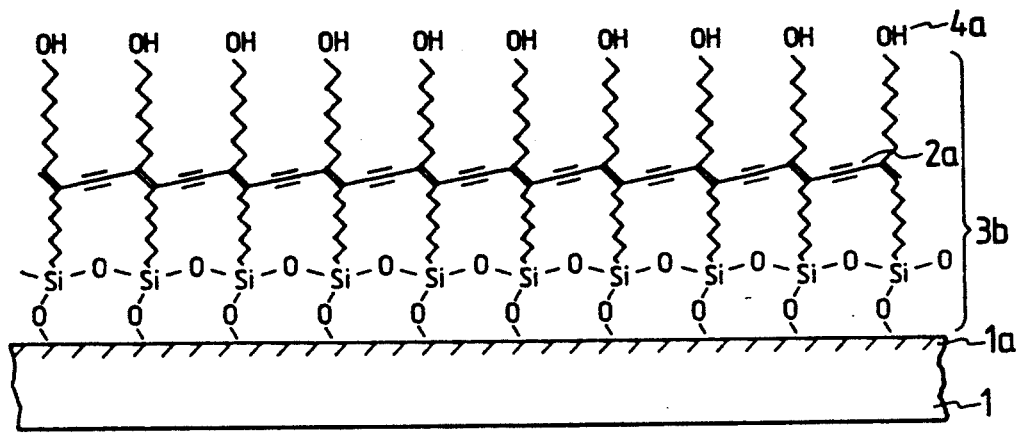
Figure 1D:
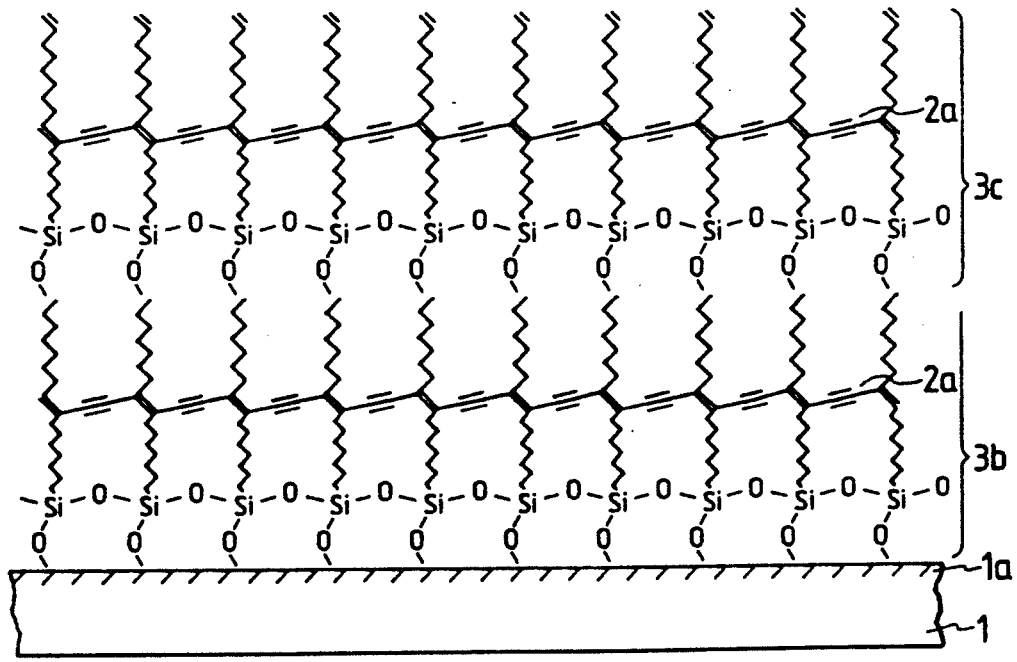

If it is desired that the number of the monomolecular adsorption layers be increased, the following procedure is taken. After formation of one monomolecular film 3a shown in FIG. 1b, the substrate on which the monomolecular film 3a has been formed is immersed in a tetrahydrofuran solution of 1 mol/liter of diborane at room temperature for 10 to 60 minutes, followed by further immersion first in a solution of 0.1 mol/liter of NaOH and then in an aqueous 30% H$_2$O$_2$ solution. As a result, an OH group is added to the vinyl group 4 which has been Juxtaposed on the surface of the monomolecular film 3a, thereby forming a monomolecular film 3b as shown in FIG. 1c. Subsequently, when the chemical adsorption using the reaction solution as used before and the OH addition reaction are repeated, a required number of monomolecular layers can be built up to obtain a built-up film with a desired thickness. More particularly, the silane surface active agent as used in FIGS. 1a and 1b is reacted with the OH group 4a of the monomolecular film 3b to build up a monomolecular film 3c similar to the monomolecular film 3a having the bonding 2a as shown in FIG. 1d. By repeating the chemical adsorption and the OH addition reaction a desired number of times, the desired number of monomolecular built-up layers can be obtained.

The conversion of the vinyl group 4 into the —CH$_2$—CH$_2$—OH 4a may be carried out in an atmosphere of O$_2$ by irradiation of X-rays, electron beams, gamma ray or the like.

Moreover, if the molecule having the diacetylene group is substituted at one end with an —Si(CH$_3$)$_2$H group, this group can be readily converted into an —OH group only by treatment with an aqueous alkaline solution. This is more effective in building up monomolecular adsorption layers. For this purpose, 1-(dimethylsilyl)-ω-vinyl-tricosadiynoic trichlorosilane is preferably used.

Figure 3:
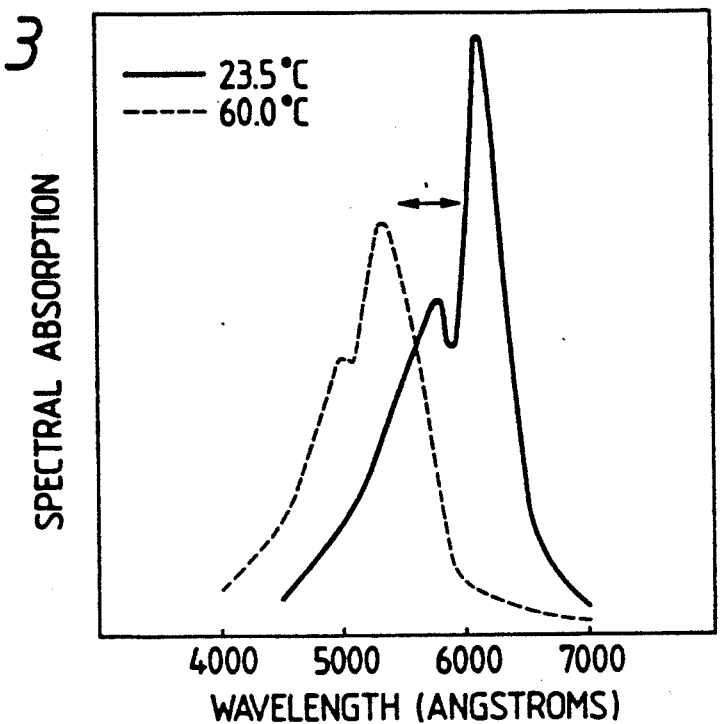
FIG. 3 is a representation of the variation in visible light spectrum of a polydiacetylene film produced by irradiation of light.

When the optical recording medium having a monomolecular adsorption film or a monomolecular built-up film is irradiated with an Ar ion laser beam, the blue color of the film is changed to a red color, thus optical information recording being possible. This color change reaction is ascribed to the temperature rise of the film by application of the beam. This was confirmed through a heating test of the film wherein the film kept at 23.5° C. assumed a blue color and when it was heated to 60.0° C., the red color appeared. The spectral variations of the film are shown in FIG. 3 wherein the solid spectral curve indicates a blue color and the dotted curve indicates a red color.

Figure 4:
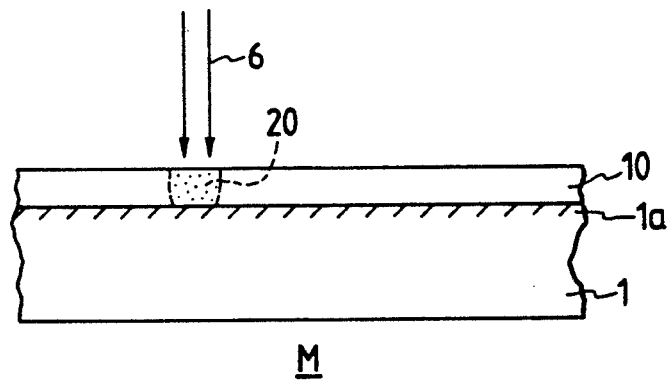
FIGS. 4 and 5 are respectively, schematic side views illustrating information recording and reading operations using an optical disk with an optical recording layer according to the invention.
Figure 5:
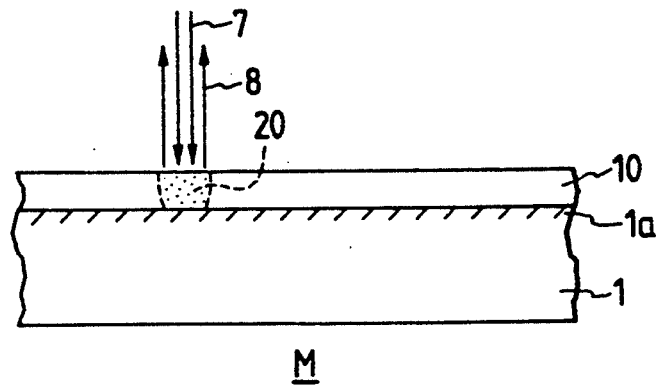

Reference is now made to FIGS. 4 and 5 wherein optical recording and reading procedures are illustrated. In these figures, there is schematically shown an optical recording medium M which includes a substrate 1 having a hydrophilic layer 1a and an optical recording layer 10. This layer 10 is a monomolecular film or monomolecular built-up film of polydiacetylene formed as described with reference to FIGS. 1a to 1d. As shown in FIG. 4, first light 6, e.g. a laser beam with a wavelength of 630 nm, converged to a desired extent of, for example, 2 micrometers in diameter is selectively irradiated to the film 10 in a desired pattern. The irradiated portion 20 undergoes a color change in the form of dots. Thus, information is written in the portion as spectral variations.

Subsequently, when second light 7, e.g. a laser beam with a wavelength of 540 nm, is irradiated, the absorption of the beam in the irradiated portion 20 differs from that of the beam in the other portion. When the difference in reflected light 8 based on the color change is detected, the written information can be read out.

When the information is recorded at a film temperature of not higher than 70° C., the red color is reversibly converted into a blue color by thermal annealing. The thermal annealing is carried out by gradually cooling the film from approximately 60 to normal temperatures, e.g. 25° C. By the thermal annealing, the information can be erased.

In order to employ the medium as a write-once medium wherein information is recorded without further erasure, it is sufficient to record information in such a way that irradiated dots are heated to a temperature not lower than 80° C. On the contrary, if the medium is used as an erasable or rewriteable optical recording medium, the light irradiation should be effected under such conditions that the irradiated portion is not raised to a temperature of 70° C. or higher, i.e. the temperature of the irradiated portion should be not higher than 70° C.

In the above embodiment, the monomolecular film using the silane surface active agent of $CH_2=CH-(CH_2)_{11}-C\equiv C-C\equiv C-(CH_2)_8-SiCl_3$ has been illustrated, other silane surface active agents mentioned before may be likewise used. In addition, if the methylene groups adjacent the diacetylene bonding, $-C\equiv C-C\equiv C-$, in the molecule are replaced by other functional groups such as phenylene, chenylene, pyrrole and the like, the light absorption in the polydiacetylene monomolecular film can be varied. If these substituted diacetylene derivatives are superposed one by one to form a built-up film wherein absorption characteristics are different from one another, an optical multiple-recording medium can be obtained.

Moreover, when sensitive dyes such as merocyanine or phthalocyanine dyes are added to diacetylene compounds and the mixture is used to form the monomolecular film, recording sensitivity may be appropriately controlled.

It should be noted that any compound having a diacetylene bonding in the molecule and capable of undergoing chemical adsorption is usable in the practice of the invention although the chemical structure of the monomolecular film formed will differ. In addition, if a functional group having photochromic characteristics such as a spiropyran group is introduced instead of the diacetylene group, a similar optical recording medium may be made using chemical adsorption.

As will be apparent from the foregoing description, a polydiacetylene thin film for optical recording medium having a large area can be efficiency fabricated. The chemical adsorption technique is far simpler than the LB technique with a significant reduction in production costs.

The polydiacetylene monomolecular film fabricated according to the chemical adsorption has high performance because it has a higher density at the molecular level and a more reduced number of pinholes than that obtained by the LB method.

Since the built-up film has the respective layers chemically bonded as set forth before, the layers do not separate from one another with very high reliability. Theoretically, a desired number of monomolecular layers wherein the conjugated bonds in the respective layers have different absorption characteristics can be built up. This is very effective in producing an optical multiple recording medium.

What is claimed is:

1. A method for making an optical recording medium, comprising:
   (a) immersing a substrate having a hydrophilic surface in a non-aqueous solution of a substance having a $-C\equiv C-C\equiv C-$diacetylene group and a $-Si-Cl$ group in an organic solvent to form a monomolecular film of the substance on the substrate by chemical adsorption between the hydrophilic surface and the $-Si-Cl$ group;
   (b) irradiating the thus immersed substrate with an energy beam to activate and polymerize the diacetylene groups in the monomolecular film thereby forming an optical recording layer, whereby the monomolecular film serving as the optical recording layer has a polydiacetylene bonding assuming a certain color which is capable of undergoing a photochromic color change on irradiation with light energy beams and is aligned under the substrate;
   repeating the immersing step when the substance has a substituent capable of reacting with the $-Si-Cl$ group to form a monomolecular built-up film; and then
   subjecting the built-up film to step (b) to thereby form polydiacetylene bonds in the respective layers of the film.

2. A method according to claim 1, wherein at least one of said first and second substances is a silane surface active agent of the formula

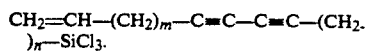

wherein m and n are, respectively, an integer of 1 to 10.

3. A method according to claim 2, wherein the silane surface active agent is omega-vinylpentacosadiynoic trichlorosilane.

4. A method according to claim 2, wherein the silane surface active agent is 1-(dimethylsilyl)-1-omega-vinyl-tricosadiynoic trichlorosilane.

5. A method according to claim 1, wherein the immersing step is repeated more than once until a build-up layer film of a plurality of monomolecular layers is obtained.

6. A method for making an optical recording medium comprising:
   (a) immersing a substrate having a hydrophilic surface in a non-aqueous solution of a first substance provided with a —C≡C—C≡C— diacetylene group and a —Si—Cl group and is terminated with a —CH=CH$_2$ group at one end in an organic solvent to form a monomolecular film of the first substance on the substrate by chemical adsorption on that the —CH=CH$_2$ group is exposed and juxtaposed onto the substrate;
   (b) converting the —CH=CH$_2$ group into a —CH$_2$CH$_2$OH group after the step (a);
   (c) immersing the substrate in a non-aqueous solution of a second substance having a diacetylene group and a —Si—Cl group to form a monomolecular film of the second substance by chemical adsorption and thereby forming a monomolecular double-layer built-up film;
   (d) irradiating the substrate obtained in step (c) with an energy beam to activate and polymerize the diacetylene groups in the respective layers thereby forming an optical recording layer, whereby the monomolecular built-up film has polydiacetylene bonds assuming a certain color which undergoes a photochromic color change on irradiation with a light energy beam; and
   irradiating the thus immersed substrate with an energy beam to activate and polymerize the diacetylene groups in the monomolecular film prior to step (b).

7. A method according to claim 6, further comprising repeating steps (a) and (b) a number of time to form a built-up film of a plurality of monomolecular layers of the substance.

8. A method according to claim 5, further comprising after each step (a)
   irradiating the thus immersed substrate with an energy beam to activate and polymerize the diacetylene groups in the monomolecular film prior to each step (b).

9. A method according to claim 6, wherein at least one of said first and second substances is a silane surface active agent of the formula

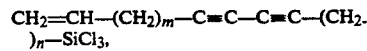

wherein m and n are, respectively, an integer of 1 to 10.

10. A method according to claim 9, wherein the silane surface active agent is omega-vinyl-pentacosadiynoic trichlorosilane.

11. A method according to claim 9, wherein at least one of the methylene groups adjacent the diacetylene group in the silane surface active agent is replaced by another functional group so that the respective monomolecular layers have different light absorption characteristics.

* * * * *

UNITED STATES PATENT AND TRADEMARK OFFICE
CERTIFICATE OF CORRECTION

PATENT NO. : 5,324,548
DATED : June 28, 1994
INVENTOR(S) : Kazufumi OGAWA et al

It is certified that error appears in the above-indentified patent and that said Letters Patent is hereby corrected as shown below:

On the title page, please delete item [*] and replace with the following:

--[*] Notice: The portion of the term of this patent subsequent to Mar. 23, 2010 has been disclaimed.--

Signed and Sealed this

Twenty-fourth Day of January, 1995

Attest:

BRUCE LEHMAN

*Attesting Officer*     *Commissioner of Patents and Trademarks*